United States Patent
Malone et al.

(10) Patent No.: US 10,731,084 B1
(45) Date of Patent: Aug. 4, 2020

(54) PITCH PROCESS

(71) Applicants: Donald P Malone, Grayson, KY (US);
David C Boyer, Fleming Island, FL (US); Thomas C Holcombe, Hillsborough, NJ (US)

(72) Inventors: Donald P Malone, Grayson, KY (US);
David C Boyer, Fleming Island, FL (US); Thomas C Holcombe, Hillsborough, NJ (US)

(73) Assignee: Advanced Carbon Products, LLC, Hitchins, KY (US)

( * ) Notice: Subject to any disclaimer, the term of this patent is extended or adjusted under 35 U.S.C. 154(b) by 167 days.

(21) Appl. No.: 15/899,816

(22) Filed: Feb. 20, 2018

Related U.S. Application Data

(60) Provisional application No. 62/600,402, filed on Feb. 21, 2017.

(51) Int. Cl.
| | | |
|---|---|---|
| *C10C 1/19* | (2006.01) | |
| *C10C 3/02* | (2006.01) | |
| *B01J 19/24* | (2006.01) | |
| *C10C 3/00* | (2006.01) | |
| *B01J 19/18* | (2006.01) | |

(52) U.S. Cl.
CPC .......... *C10C 3/026* (2013.01); *B01J 19/1862* (2013.01); *B01J 19/242* (2013.01); *C10C 3/002* (2013.01); *B01J 2219/00716* (2013.01)

(58) Field of Classification Search
CPC .................................. C10C 1/19; C10C 3/002
See application file for complete search history.

(56) References Cited

U.S. PATENT DOCUMENTS

| | | | | |
|---|---|---|---|---|
| 4,026,788 A | | 5/1977 | McHenry | |
| 4,528,087 A | * | 7/1985 | Shibatani | D01F 9/145 208/22 |
| 4,581,124 A | * | 4/1986 | Gomi | C10G 51/023 208/39 |
| 4,663,021 A | * | 5/1987 | Arai | C10C 3/002 208/106 |
| 4,663,022 A | * | 5/1987 | Gomi | C10G 55/04 208/106 |
| 4,705,618 A | * | 11/1987 | Tsuchitani | C10C 1/08 208/40 |
| 4,789,456 A | * | 12/1988 | Tsuchitani | C10C 3/00 208/22 |
| 7,318,891 B1 | | 1/2008 | Malone | |
| 9,222,027 B1 | | 12/2015 | Malone et al. | |
| 9,376,626 B1 | | 6/2016 | Malone et al. | |

* cited by examiner

*Primary Examiner* — Randy Boyer
(74) *Attorney, Agent, or Firm* — Richard D. Stone

(57) ABSTRACT

A process for making mesophase and/or isotropic pitch. An aromatic rich liquid is charged at high temperature and pressure to a first thermal polymerization reactor to produce an isotropic pitch rich liquid which is flashed. Residual liquid is charged to a second thermal reactor to produce mesophase pitch. The reactors can be either tubular reactors or CSTRs.

20 Claims, 1 Drawing Sheet

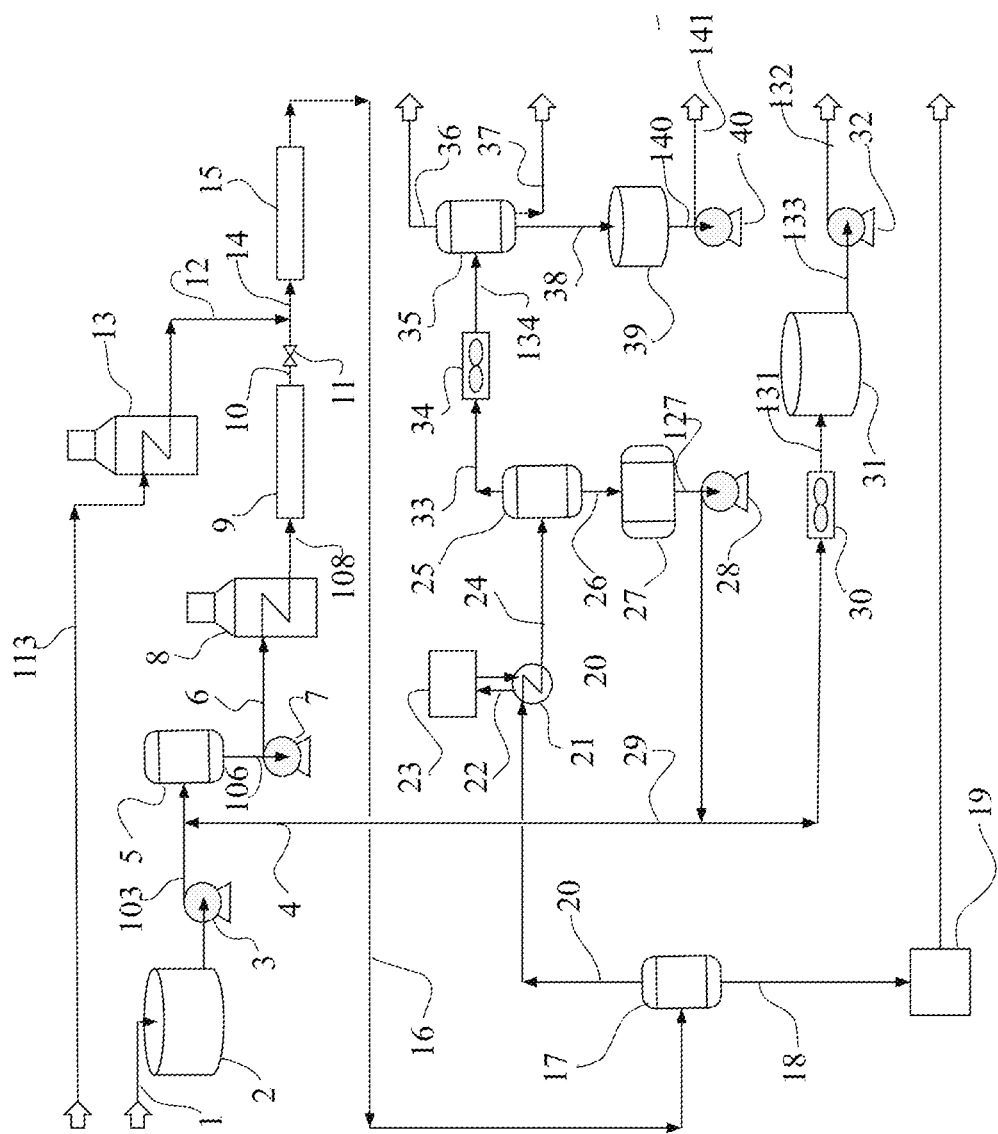

10,731,084 B1

PITCH PROCESS

CROSS REFERENCE TO RELATED APPLICATIONS

This application claims the benefit of prior provisional application No. 62/600,402, filed Feb. 21, 2017, which is incorporated by reference. Our two recent patents, U.S. Pat. Nos. 9,222,027 and 9,376,626 are related.

FIELD OF THE INVENTION

This invention relates to formation of isotropic or mesophase pitch.

BACKGROUND OF THE INVENTION

Much work has been done on making isotropic or mesophase pitch. Our two recent patents, mentioned above are directed to making isotropic and mesophase pitch respectively.

Although the approaches in the above patents are believed to be the best available technology for making isotropic and mesophase pitch, we have continued our research with a view to improving these processes. We developed an improved two stage process and also provided a better single stage process.

BRIEF SUMMARY OF THE INVENTION

Accordingly, the present invention provides a two stage process for producing mesophase pitch from an aromatic liquid comprising thermally polymerizing an aromatic liquid feed comprising at least a portion of 2 and 3 ring aromatics by charging said feed to a first stage reactor operating at thermal polymerization conditions including fully developed turbulent flow and a temperature high enough to induce thermal polymerization and a pressure high enough to maintain at least a portion of said 2 and 3 rings aromatics in the liquid phase for a time sufficient to convert at least a majority by weight of said 2 and 3 ring aromatics into isotropic pitch and a minor portion into light normally gaseous hydrocarbons and discharging a first stage reactor effluent, flashing said first stage reactor effluent to remove at least a majority of said light normally gaseous hydrocarbons in a flash zone having an absolute pressure no more than ½ the absolute pressure in said first stage thermal polymerization reactor to produce a flash effluent liquid stream, thermally polymerizing said flash effluent liquid stream in a second stage reactor at thermal polymerization conditions including a pressure no more than ½ the absolute pressure in said first stage reactor and temperature sufficient to induce thermal polymerization of said effluent and convert at least a majority by weight of said effluent into mesophase pitch, and recovering mesophase pitch from said second stage reactor as a product.

The present invention also provides a process for thermally polymerizing an aromatic liquid feed containing 2 and 3 ring aromatic compounds comprising thermally polymerizing said feed in a turbulent isotropic pitch reactor at conditions including a pressure high enough and temperature low enough to maintain at least a majority of said 2 and 3 ring aromatic compounds in the liquid phase and a time long enough and temperature high enough to thermally polymerize at least a majority of aromatics in said feed to produce an isotropic pitch intermediate product comprising a contaminating amount of mesophase pitch in an amount sufficient to make said isotropic pitch unsuitable for use as an isotropic pitch product, then flashing said isotropic pitch intermediate product in a flash vessel operating at flash conditions sufficient to vaporize at least a majority of said 2 and 3 ring aromatic compounds remaining in said isotropic pitch intermediate to produce a flashed isotropic pitch intermediate product with a contaminating amount of mesophase pitch, thermally polymerizing said flashed isotropic pitch intermediate product in a turbulent mesophase pitch reactor operating at thermal polymerization conditions including a pressure less than half that of said pressure in said isotropic pitch reactor and a time and temperature sufficient to convert at least a majority of said flashed isotropic pitch intermediate product to mesophase pitch, and recovering said mesophase pitch as a product of the process.

Further, the present invention provides a process for producing isotropic pitch from an aromatic liquid comprising 2 and 3 ring aromatics, said process comprising heating said aromatic liquid to a temperature sufficient to induce thermal polymerization while maintaining a pressure sufficient to maintain at least a majority by weight of said 2 and 3 ring aromatics in the liquid phase while maintaining fully developed turbulent flow for a time sufficient to convert at least a majority by weight of said aromatic liquid and said 2 and 3 ring aromatics to isotropic pitch.

BRIEF DESCRIPTION OF THE DRAWING

The FIGURE is a simplified view of an embodiment of a two-stage process for producing mesophase pitch from an aromatic liquid. A fresh feedstock consisting of a filtered aromatic liquid 1 is fed into feed tank 2, then charged via pump 3 into line 103, mixed with a recycled heavy aromatic stream in line 4 and discharged into mixed feed drum 5. The mixed feed is withdrawn via line 106 and pump 7 increases the pressure for discharge into fired heater 8. Heated mixed feed is then charged via line 108 into a first stage tubular reactor 9, wherein the feed is partially converted into a mixture of isotropic and mesophase pitch. The reactor effluent is discharged via line 10 from the first stage reactor and passed through a pressure letdown valve 11, reducing the pressure. The flashed partially converted mixture is then mixed with superheated steam added via line 12, produced by passing boiler feed water in line 113 through steam boiler/superheater 13. The steam to hydrocarbon molar ratio is usually more than 1:1, e.g., 3/1. The resulting mixture in line 14 is fed to the second stage tubular reactor 15 where additional mesophase is formed. The second stage reactor effluent is discharged via line 16 into vapor/liquid separator 17. The liquid stream 18 leaving this separator contains 85-90 wt % mesophase pitch (with the balance being primarily isotropic pitch) and represents an 88 wt % yield on the fresh feedstock. Stream 18 is recovered for storage and distribution by feeding it to pitch cooling and solidification system 19. The vapor 20 from vapor/liquid separator 17 is cooled to 310 degrees F. in shell and tube heat exchanger 21 using glycol/water cooling stream 22 from glycol cooling system 23. Any other conventional cooling means may be used, such as feed/product exchange, air cooling via fin-fan coolers, or cooling water from a cooling tower. The cooled vapor stream 24 passes into vapor/liquid separator 25, where a heavy aromatic stream 26 is drawn off the bottom and briefly stored in heavy aromatic tank 27. This heavy aromatic material is then withdrawn via line 127 and pump 28 and either recycled via line 29 to feed drum 5 or cooled with air cooler 30, sent via line 131 to heavy aromatic tank 31 for storage and pumped out via line 133, pump 32, and line 132 for sale as a valuable byproduct, e.g., an aromatic rich solvent. The overhead vapor removed via 33 from vapor/liquid separator 25 is cooled to 120 degrees F. in air cooler 34 and discharged via line 134 into three-phase separator 35. A vapor phase is removed overhead via line 36. Water from steam condensate is removed from the bottom of the separator via line 37. A light hydrocarbon stream is removed via line 38 and discharged into light hydrocarbon storage tank 39, where it is pumped out via line 140, pump 40 and line 141.

DETAILED DESCRIPTION

The details on feed, products and reaction conditions in tubular reactors are described in our related earlier patents, incorporated by reference and not repeated here.

First Stage

A tubular reactor and relatively high pressure are preferred. What is different from our earlier work is pushing the conversion of aromatics to pitch molecules. In our earlier patents, we tried to limit mesophase content in an isotropic pitch product preferably to 1 wt % or less. While this is a valid and excellent approach when isotropic pitch is the desired product, it is not always optimum when some or all of the isotropic pitch product will be converted to mesophase pitch. When mesophase is the ultimate goal, it can be beneficial to operate the first stage of the process to produce isotropic pitch which is "contaminated" with more than 1 wt % mesophase, preferably more than 2-5 wt % mesophase, and ideally more than 10-25 wt % mesophase or even more.

This contaminated product from the first stage is neither "fish nor fowl" and has little or no value as an isotropic pitch product, but it is an ideal charge stock to the second reaction stage, where additional thermal polymerization will make a saleable mesophase product. Flashing the first stage removes light gasses formed as a byproduct of thermal polymerization and thermal dealkylation and also preferably removes 2 and 3 ring aromatic compounds. In the second stage reactor, lower pressure facilitates mesophase formation. The 2 and 3 ring aromatic compounds are removed since they are believed to interfere with mesophase formation.

When the first stage is conducted in a continuously stirred tank reactor (CSTR), the chemistry and general approach are similar, but there are different constraints and concerns. The thermal reactions forming isotropic pitch and to a limited extent mesophase pitch are the same. but the reactants are somewhat different and the amount of mesophase which can be tolerated is often significantly reduced.

The reactants in a CSTR can be different because the CSTR typically consists of a stirred vessel with stirred liquid in the bottom and vapor space above. The materials in the vapor phase have a harder time reacting with materials in the liquid phase since there is greatly reduced contact as compared to the intense contact of vapor and liquid in a tubular reactor.

The amount of mesophase in the first stage product which can be tolerated will usually be less than can be tolerated in a tubular reactor. A tubular reactor keeps everything moving and the walls thereof are wiped clean, to a great extent, by the fluid flowing through. The situation is similar to that experienced by refiners trying to use cooling water from the Mississippi River with a high solids content. Dirty cooling water can be used, but only in tube type heat exchangers and only when flow rates are kept high. In a typical CSTR the walls of the vessel and the paddles of the impeller or other mixing device can tolerate some mesophase, but generally not as much as can be tolerated in a tubular reactor.

The pressure in the first stage should be high to keep more 2 and 3 ring aromatics in the liquid phase. These aromatic materials can be converted to isotropic pitch, but generally only when they are in the liquid phase.

Second Stage

The second stage can operate as described in our earlier patent on mesophase production when a tubular reactor is used.

The pressure in the second stage should be reduced at least 50%, in absolute terms, as compared to the pressure in the first stage. When maximum mesophase production and concentration are the goal, preferably the pressure is sufficiently low, and temperature sufficiently high, to vaporize at least a molar majority of 2 and 3 ring aromatic compounds. These 2 and 3 ring aromatics tend to interfere with mesophase formation so they are best removed.

When a CSTR reactor is used, even greater care is required in design and operation to avoid plugging the thermal reactor. The mesophase content will be generally above 50 wt %, and this material is hot enough to readily form coke and sticky enough to readily clog vessels or impellers. CSTR operation can be prolonged to some extent by using higher impeller speeds and/or swing reactors.

One advantage that CSTRs have over tubular reactors is that they are cheaper to build and require only a small footprint.

Preferably there is little or no external heating of flash effluent discharged into the $2^{nd}$ stage reactor. Preferably there is no external heating of the second stage reactor. This is because these mesophase rich, coke prone materials tend to coke on hot surfaces.

Heat Balance

The heat requirements of the second stage of the process are preferably and largely supplied by the feed. The feed to and the product from the first stage reactor can tolerate significant conventional heating, e.g., in a fired heater or immersion in a molten metal or molten salt bath. The thermal reactions occurring in the first reactor are largely governed by time and temperature. Reaction rates roughly double for every 10° C. temperature increase so running the first reactor hotter can permit reduction in the reactor size.

The first stage reactor effluent will cool significantly when flashed to remove light ends and 2 and 3 ring aromatic compounds. The residual liquid from this flash will still be very hot, in many cases sufficiently hot to induce thermal polymerization in the second stage reactor. Additional heat may be added to the second stage reactor in the form of a superheated fluid, preferably superheated steam. The second stage reactor operates at much lower pressure than the first stage, so construction costs can be reduced significantly due to the lower pressure operation. The reactor residence time may be increased by using a larger inside diameter and/or longer length tube reactor or by using a larger CSTR.

Additional residence time may be achieved by using multiple reactors in series or recycling some of the second reactor effluent back to the first reactor. Normally once through operation is preferred, both to reduce capital and operating costs and because the liquid effluent from the second reactor is mesophase rich and cokes readily.

When a CSTR reactor is used, heat may also be added by mixing or mechanical energy. Energy can be added by a conventional mixing impeller. There is no free energy, rather the electrical or steam driven pump transfers energy into the second reactor by intense mixing.

Other forms of energy may be added, e.g., ultrasound or microwave energy, such as the use of microwaves to heat coal as disclosed in U.S. Pat. No. 3,503,865, COAL LIQUEFACTION PROCESS, Stone.

Illustrative Embodiments

The data and discussion which follow are based on limited lab experiments on different parts of the process with considerable extrapolation and estimating. They are reasonably reliable estimates, but not actual experiments.

Case 1—Two Tubular Reactors

This is the reactor design illustrated by the FIGURE. While the discussion associated with the FIGURE is primarily directed to a mesophase product, the design permits recovery of relatively pure isotropic pitch, either as an intermediate or a final product. A relatively pure isotropic pitch may be recovered as an intermediate product when conversion in the first tubular reactor is limited by the amount of mesophase which can be tolerated in the product. In this instance, operating the first stage reactor to convert most of the feed to isotropic pitch, but limiting conversion so that the intermediate pitch product has less than 2 wt % mesophase, or 1 wt % mesophase, or 0.5 wt % mesophase or less. This will not maximize production of mesophase overall, but it will allow recovery of some isotropic pitch product from the intermediate separator and some mesophase pitch product downstream of the second thermal reactor.

It will also be possible to obtain a relatively pure isotropic pitch product as a product from the second thermal reactor. The first thermal reactor converts a desired amount of aromatic feed to isotropic pitch, usually 10-60 wt %, preferably less than 50 wt % conversion to isotropic pitch, with conversion to the desired isotropic pitch content, typically about 70 wt %, or 80 wt %, or 90 wt % in the second thermal reactor. It will usually be necessary to flash intermediate the two thermal reactors, as usually the second thermal reactor will be designed for lower pressure operation than the first thermal reactor, but it is beneficial to keep more of the 2 and 3 ring aromatic compounds in the liquid phase, to facilitate their conversion in the second thermal reactor. A good flash approach is to reduce the pressure sufficiently to remove most of the lighter byproducts and most of the 2 ring aromatics while keeping at least a molar majority of the 3 ring aromatics in the residual liquid phase removed from the flash. This residual liquid phase may then be charged to the second thermal reactor, preferably with superheated fluid injection after the flash.

Case 2—Tubular Reactor to CSTR

This approach can be similar to the Case 1 approach. The first thermal reactor is a tubular reactor while the second is a CSTR. The pressure will be lower in the CSTR which favors vaporization of 2 and 3 ring aromatics and which favors mesophase formation.

Case 3—CSTR to Tubular Reactor

The first thermal reactor is a stirred tank reactor. Although a robust reactor design will be necessary to deal with the operation at high pressure, the reactor will be relatively easy to operate at least in terms of coking concerns. The first reactor can leave most of the feed unconverted so the fluids are fairly easy to stir. The coking tendency of the material increases as the percent pitch, especially the percent mesophase pitch increases. Thus, most of the coking concerns are shifted downstream to the second thermal reactor which is a tube operating in fully developed turbulent flow.

The first reactor should operate at a relatively high pressure sufficient to maintain at least a majority of the 3 ring aromatics in the liquid phase, preferably with most of the 2 ring aromatics in the liquid phase. These aromatics can be converted to pitch, but liquid phase operation is preferred. Flashing or some means of pressure reduction will usually be necessary intermediate the first and second reactors, to remove at least a majority of any remaining unconverted 2 and 3 ring aromatic compounds.

This approach, CSTR to tubular reactor, allows for a relatively compact and simple first reactor, with increased fluidity largely offsetting coking risks, and the tubular reactor can rely on turbulent flow to reduce coking.

CASE 4—2 CSTRs

In this approach, stirred tank reactors are used for both the first and second thermal reactors. Pressures are relatively high in the first reactor, to keep 2 and 3 ring aromatics in the liquid phase. The flashing step removes most of the 2 and 3 ring aromatics which favors thermal conversion to mesophase in the second thermal reactor. Coking concerns are significant with this approach as mesophase is close to coke. For this reason, it may be beneficial to have multiple CSTRs so that if one CSTR cokes up, it can be swapped out for decoking.

Residence Time Affect on Product Properties

In some applications, it will be important to have a final mesophase or isotropic pitch product with a relatively narrow range of molecular weights. Use of tubular reactors with precisely controlled residence time in the thermal reactors will yield a product with the narrowest molecular weight range. In some applications, it may be beneficial to have some distribution of molecular weights. To facilitate mesophase pitch processing, it is frequently beneficial to have some amount of isotropic pitch, say 5, 10 or 15 wt %, as a softening agent. A CSTR reactor will have a range of liquid residence times whereas a tubular reactor does not.

The process of the present invention provides what is believed to be the most cost-effective method of producing mesophase pitch from aromatic liquids. Much of the benefit is achieved by close coupling of the first and second reactor stages. There is no need to cool down the isotropic pitch material, and little or no preheating of it is needed upstream of the second stage of the reactor.

In addition, the process is flexible, and may be used to recover isotropic pitch from the flash vessel intermediate the two stages.

In addition, the process provides a way to produce pure isotropic pitch in a single stage or even from two thermal reactors from an aromatic rich liquid. The process may also be used to produce a mesophase pitch from an isotropic pitch feed when desired.

Tubular reactors, with their excellent mixing characteristics, their ability to resist fouling and their ability to add some heat via heating of the tube walls with electricity have been proven to work well in our laboratory. In some applications, the relatively large footprint and relatively low capacity and the careful fabrication required when some types of electrical heating are used may be significant enough concerns to merit the use of CSTRs in either the first or second reactor or both.

CSTRs are probably slightly less chemically efficient than a tube reactor when used for the first stage reactor. The 2 and 3 ring aromatic compounds will concentrate in the vapor phase above the liquid in the CSTR. These aromatics are potentially convertible to isotropic pitch, but to do so they have to be in close contact with larger aromatics in the liquid phase. CSTRs are thus at a slight disadvantage in the first reactor for this reason. In the second stage reactor which is the one forming mesophase pitch, we found that the presence of 2 and 3 ring aromatics tends to interfere with the formation of large mesophase molecules so the vapor space above the stirred liquid is somewhat advantageous in the second stage reactor.

Discussion/Optimization

While the discussion and claims at times refer to 2 and 3 ring aromatic compounds, in many applications only one of these may be needed to help optimize the process. Thus, it may be sufficient to design and maintain say the first thermal reactor with sufficient pressure to maintain 3 ring aromatic compounds primarily in the liquid phase, preferably 60, 70, 80, 90% or more of these in the liquid phase. The process will still work if the 2 rings aromatics are in the vapor phase at times or continuously. Alternatively, a refiner might focus on keeping at least a majority, preferably 60, 70, 80, 90% or more of the 2 rings aromatics in the liquid phase, trusting to vapor/liquid equilibrium to keep the 3 ring aromatics in the liquid phase to an even greater extent. Considerably oversimplifying, it will usually be beneficial to have a pressure high enough to keep most of the 2 rings aromatics in the liquid phase in the first reactor and sufficiently low to reject most of the 3 rings aromatics to the vapor phase in the second reactor.

We prefer to operate the reactors to achieve conversion of most of the feedstock to isotropic pitch in the first thermal reactor and convert most of the first reactor effluent to mesophase pitch in the second thermal reactor. Profitable operation may be achieved with much lower conversions, provided there is either a market for the by-products or sufficient capital and operating funding to recycle unconverted materials. The threshold for a viable commercial plant is probably about 20% conversion of liquid aromatic feed to isotropic pitch. Similarly, it is not essential to convert most of the feed to the second thermal reactor to mesophase pitch, with conversions of 20, 30, 40% or more being satisfactory.

A preferred approach is to push the first reactor fairly hard and convert most of the aromatic liquid feed to isotropic pitch, preferably a pitch severely "contaminated" with mesophase, at least 1 wt %, preferably 2, 3, 4, 5, 7, 10, 15, 20 wt % or more. This approach will ensure that most of the readily convertible molecules in the feed are converted to a pitch product. In general, the aromatic liquid feeds contemplated for use herein will contain significant amounts of 2 and 3 ring aromatics, which have relatively low value/price. The economics of the process are better if this low-cost feed can be converted to higher value mesophase pitch.

Conditions in the first thermal reaction zone will preferably include a temperature of 850° to 1000° F., preferably 900° to 950° F., and ideally 925° F. Pressure should be enough to maintain the desired amount of 2 or 3 ring aromatics in the liquid phase and preferably from 100 to 3000 psia, more preferably 500 to 2500 psia, ideally 1000 to 2000 psia. Residence time is primarily dependent on temperature and conversion desired, but it will typically range from 10 seconds to 10 minutes, preferably 0.5 to 5 minutes, and ideally around 2 or 3 minutes.

Conditions in the second thermal reaction zone will almost invariably involve a significantly lower pressure and shorter residence time. Pressure should be less than ½ the absolute overall pressure in the first thermal reactor, and typically will be 100 psia or less, preferably less than 50 psia and ideally 30 psia or less or even atmospheric or sub-atmospheric pressure. Residence time required to achieve the desired conversion of feed to mesophase will typically be under a minute, preferably 0.1 to 10 seconds, ideally 0.2 to 2 seconds.

The pressure and temperature in the first and second zones lend themselves to a relatively simple commercial process design with all or essentially all of the heat and pressure energy added at the inlet of the first reactor. There will be plenty of pressure to get reactants through the first stage reactor and into the flash or second thermal reactor. The temperature in the first reactor can be selected to be high enough so that after flashing, the liquid phase is at or near the temperature required in the second stage reactor. In this way, all the heat required can be added to the feed to the first reactor. All the pressure required to get reactants through the process can be added upstream of the first reactor.

The flash zone is an essential concept to permit vaporization of 2 and 3 rings aromatics from the isotropic pitch "product", but a flash vessel is not, per se, a requirement. It is possible to flash the isotropic pitch liquid relying solely on fluid dynamics in a tubular reactor, preferably with an enlarged inside diameter tube in the second reactor section. The isotropic pitch rich liquid discharged into the tube forming the second thermal reactor will flash in the tube so that the liquid phase will be depleted in 2 and 3 rings aromatics. It is possible to have a flash drum at relatively high pressure, sufficiently low to permit removal of most of the 2 and 3 rings aromatics from the isotropic pitch discharged into this high-pressure flash. Then the liquid phase from the high-pressure flash may be charged into the second thermal reactor. It is possible to have a flash drum at relatively low pressure to facilitate removal of an increased amount of 2 and 3 rings aromatics.

Direct Contact Heating/Stripping

A superheated fluid, preferably superheated steam, can be added to supply any heating or stripping needs of the process. Superheated steam can be added in minor amounts, say 1 to 10 wt % of the liquid, when little heating is required and modest stripping or removal of 2 and/or 3 rings aromatics is required. There is no upper limit on superheated steam addition, with amounts up to 50 wt %, 100 wt %, 200 wt % or more being contemplated when some heating of liquid is required. Although steam is preferred, other superheated fluids may be used when desired, e.g., hydrogen, normally gaseous hydrocarbons and the like.

Our process has multiple applications. The process can be used to make mesophase pitch from an aromatic oil feed using 2 plug flow reactors in series, preferably with pressure reduction intermediate the two reactors sufficient to vaporize at least a majority of 2 ring aromatic compounds in the feed or produced by thermal polymerization in the $1^{st}$ reactor.

In other embodiments, the process may be used to produce an isotropic pitch and a mesophase pitch using two thermal reactors in series. The first thermal reactor should operate at a pressure sufficient to maintain at least a majority of 3 ring aromatic compounds in the feed in the liquid phase in the first reactor and a temperature sufficient to thermally polymerize at least a majority of 3 ring and heavier aromatics to isotropic pitch to produce a first reactor effluent comprising isotropic pitch and no more than a predetermined amount of mesophase pitch, typically less than 1 wt %. The first reactor effluent is flashed into a flash drum operating at a pressure sufficiently low to vaporize at least a majority of 2 ring aromatic compounds present in the first reactor effluent. A portion of flash drum liquid is withdrawn as an isotropic pitch product of the process and the remainder charged to a second thermal reactor operating at a pressure low enough to vaporize at least a majority of 2 ring aromatic compounds present and for a time and temperature sufficient to convert at least a majority by weight of liquid feed to said second reactor to mesophase pitch. In a preferred embodiment, a superheated fluid such as steam or a hydrocarbon is charged to the second reactor for heating. The first thermal reactor may be either a continuous stirred tank reactor or a tubular reactor. The second thermal reactor may be either a continuous stirred tank reactor or a tubular reactor.

Preferably the pressure in the first stage reactor is from 200 to 3000 psia, more preferably 500-2000 psia, ideally 1000 psia. Preferably the pressure in the second stage reactor is one tenth or less that of the first stage reactor, more preferably from 100 psia to sub-atmospheric, ideally from atmospheric to 75 psia.

For maximum production of mesophase pitch, the first stage reactor is preferably run at thermal polymerization conditions sufficient to make a first stage reactor isotropic pitch intermediate product contaminated with a sufficient amount of mesophase pitch to make said intermediate unsuitable for use as isotropic pitch. Preferably, the first stage reactor effluent isotropic pitch intermediate product contains more than 1.0, 1.5, 2, 5, 10, 15, 20, 25, or 30 wt % mesophase pitch In some cases, the "flash zone" is merely a pressure let down valve without any removal of the vapor. In these cases, the two-phase flow would be fed to the second stage reactor. In other cases, a vapor/liquid separator may be used to remove the vapor and then only the liquid is sent to the second stage reactor. In plants operating with a flash separator, the overhead vapor from the first or flash vapor/liquid separator and vapors recovered from the second stage reactor effluent will be combined for use as fuel or other product recovery.

Recycling of heavy liquid will frequently be beneficial. If conversion in the first stage reactor is relatively low, e.g., 20-50 wt %, it will usually be beneficial to recycle some of the first stage reactor effluent to mix with the reactor feed. If conversion is low in the second reactor, e.g., 35-60% to mesophase, then the heavy distillate from the second reactor may be recycled. Preferably all liquid recycle is to the first reactor, though in some instances it may be preferred to have reactor 1 effluent liquid recycled to reactor 1 and reactor 2 effluent liquid recycled to mix with feed to the second reactor. Recycle may be necessary to improve the economics of the process, especially when the conversions per pass are relatively low.

It may be essential that steam or some other vapor, preferably a superheated vapor, be added to the feed entering the second stage reactor. Presence of this vapor reduces partial pressure, provides added thermal inertia, creates high velocities, and provides better dispersion of the pitch droplets. While any vapor could be used, we prefer a low molecular weight, condensable gas that is non-reactive and has very low solubility in the mesophase pitch. Steam is the most preferred. The amount of vapor, as a percentage of the weight of the liquid feed, could vary from 10-1000%, preferably 150-400%, more preferred 250-350%.

In some applications, it will be beneficial to have two second stage reactors (in series) or a second stage and third stage reactor. This allows feeding the mesophase pitch leaving the second stage reactor into a small "annealing" CSTR, or even into another tubular reactor, before or after removing light gases to provide additional residence time for "fine tuning" of the final mesophase pitch product.

Pressure drops can be high across the second stage reactor. In our experiments, and simulations, outlet pressures are about 40 psia plus downstream equipment pressure drop. It would be possible to pull a vacuum on the final vent gas to reduce the outlet pressure further if desired. Recommended inlet pressures for the second reactor may range from 50-1000 psia, preferably 500 psia, more preferably 100-200 psia.

Suitable operating temperatures for both the first and second stage reactors may range from 750-1100° F., preferably 800-975° F., more preferably 900-950° F.

In our mesophase process, the gas phase is continuous and the liquid phase is discontinuous. At the high specific flowrate in a tubular reactor forming mesophase, the shear rate in the reactor is very high. Typically, the pressure drop in the 9.5 mm (⅜") reactor tube was 4 to 6 bar (60 to 90 psi). At this high shear rate only small (<20 micron) droplets are present. In multiphase flow analysis, this flow regime may be described as mist annular. This relatively small spherical size combined with very turbulent flow (Reynold's number $>5\times10^5$) allows for very rapid mass and heat transfer between the liquid and steam phases. While there may be some collision of these spheres with other spheres resulting in coalescence, they are rapidly disintegrated into smaller spheres again as a result of the high shear. The vapor fraction is greater than 99% by volume. It seems likely that for the most part, the volatilization of the lighter hydrocarbons and subsequent organization of the large poly-condensed aromatics into mesophase occurs in isolated small spheres.

When the second or mesophase forming process is coupled with the first stage or isotropic pitch forming process, an important benefit also accrues. The heavy distillate by-product of the mesophase forming process is not well suited for recycle to the mesophase forming process since it will, for the most part, just vaporize and little conversion to mesophase will be achieved. This heavy distillate stream can be recycled to the feed of the isotropic pitch forming reactor where some can be converted to isotropic pitch which will convert to mesophase pitch in the second stage of our process. This extra conversion can be a crucial factor in having an economically viable process, especially when conversions per pass are low and maximum conversion is desired. Recycle of unconverted heavy aromatic liquids is largely nonproductive in a mesophase forming reactor, but recycle of this heavy liquid to the first reactor in a two stage process is highly effective.

We prefer tubular reactors over continuously stirred tank reactors (CSTR) as CSTRs are not as efficient for converting isotropic pitch to mesophase pitch. CSTRs may be useful in adjusting the final mesophase content of a tubular mesophase forming reactor. A CSTR reactor to adjust the mesophase content and perhaps other properties could be useful for quality control of the mesophase product.

Our process approach and results are surprising. We form isotropic pitch in a first stage reactor, then produce liquid mesophase pitch in a second stage reactor, preferably one which is 99 LV % vapor. We recover unconverted heavy aromatic material from the mesophase forming reactor for recycle, but do not recycle to the mesophase forming reactor.

We claim:

1. A two stage process for producing mesophase pitch from an aromatic liquid comprising
   a. Thermally polymerizing an aromatic liquid feed comprising at least a portion of 2 and 3 ring aromatics by charging said feed to a first stage reactor operating at thermal polymerization conditions including a temperature high enough to induce thermal polymerization and a pressure high enough to maintain at least a portion of said 2 and 3 ring aromatics in the liquid phase to convert at least 20 weight % of said 2 and 3 ring aromatics into isotropic pitch and into light, normally gaseous hydrocarbons and discharging a first stage reactor effluent, b. Flashing said first stage reactor effluent to remove at least a majority of said light normally gaseous hydrocarbons in a flash zone having an absolute pressure no more than ½ the absolute pressure in said first stage thermal polymerization reactor to produce a flash effluent liquid stream, c. Forming mesophase pitch from said flash effluent liquid stream in a second stage reactor at mesophase forming conditions including a pressure no more than ½ the absolute pressure in said first stage reactor and temperature to convert at least ⅓rd by weight of said flash effluent liquid into mesophase pitch, and d. Recovering mesophase pitch from said second stage reactor as a product.

2. The process of claim 1 wherein said first stage reactor is selected from the group of a tubular reactor and a continuous stirred tank reactor.

3. The process of claim 1 wherein said second stage reactor is selected from the group of a tubular reactor and a continuous stirred tank reactor.

4. The process of claim 1 wherein at least a portion of said flash effluent liquid is recovered as an isotropic pitch product.

5. The process of claim 1 wherein the pressure in said first stage reactor is from 250 to 5000 psia.

6. The process of claim 1 wherein the pressure in said second stage reactor is less than $\frac{1}{10}^{th}$ the pressure in said first stage reactor.

7. The process of claim 1 wherein the inlet pressure in said second stage reactor is from 50 to 1000 psia.

8. The process of claim 1 wherein the pressure in said second stage reactor is sufficient to maintain at least a majority by weight of said 2 and 3 ring aromatics in the vapor phase.

9. The process of claim 1 wherein the pressure in said first stage reactor is sufficient to maintain at least a majority by weight, of said 2 and 3 ring aromatics in the liquid phase.

10. The process of claim 1 wherein conditions in said first stage reactor are sufficient to create an isotropic pitch with 1 to 20 wt % mesophase pitch.

11. The process of claim 1 wherein steam is added to said second stage reactor.

12. The process of claim 1 wherein steam is added to said second stage reactor, and wherein said second stage reactor is a tubular reactor, to maintain a vapor continuous dispersed liquid droplet flow in said second stage reactor.

13. The process of claim 12 wherein said second stage reactor discharges into a cyclone separator.

14. A process for thermally polymerizing an aromatic liquid feed containing 2 and 3 ring aromatic compounds comprising:

a. Thermally polymerizing said feed in a turbulent isotropic pitch reactor at conditions including a pressure high enough and temperature low enough to maintain at least a majority of said 2 and 3 ring aromatic compounds in the liquid phase and a time long enough and temperature high enough to thermally polymerize at least a majority of aromatics in said feed to produce an isotropic pitch intermediate product comprising an amount of mesophase pitch, b. Flashing said isotropic pitch intermediate product in a flash vessel to vaporize at least a majority of said 2 and 3 ring aromatic compounds remaining in said isotropic pitch intermediate to produce a flashed isotropic pitch intermediate product with an amount of mesophase pitch, c. Forming mesophase pitch from said flashed isotropic pitch intermediate product in a mesophase pitch reactor operating at thermal polymerization conditions including a pressure less than ½ that of said pressure in said isotropic pitch reactor and a time and temperature sufficient to convert at least a majority of said flashed isotropic pitch intermediate product to mesophase pitch, d. Recovering said mesophase pitch as a product of the process.

15. The process of claim 14 wherein said isotropic pitch reactor and said mesophase pitch reactor are tubular reactors.

16. The process of claim 14 wherein said isotropic pitch reactor and said mesophase pitch reactor are continuous stirred tank reactors.

17. The process of claim 14 wherein said isotropic pitch reactor is a tubular reactor and said mesophase pitch reactor is a continuous stirred tank reactor.

18. The process of claim 14 wherein said isotropic pitch reactor is a continuous stirred tank reactor and said mesophase pitch reactor is a tubular reactor.

19. The process of claim 14 wherein superheated steam is added to at least one of said flash vessel and said mesophase pitch reactor.

20. The process of claim 14 wherein said isotropic pitch intermediate product contains more than 5 wt % mesophase pitch.

* * * * *